(12) United States Patent
Wada

(10) Patent No.: US 6,881,125 B1
(45) Date of Patent: Apr. 19, 2005

(54) APPARATUS FOR PROCESSING A LENS

(75) Inventor: Toyoji Wada, Tokyo (JP)

(73) Assignee: Hoya Corporation, Tokyo (JP)

( * ) Notice: Subject to any disclaimer, the term of this patent is extended or adjusted under 35 U.S.C. 154(b) by 5 days.

(21) Appl. No.: 10/406,611

(22) Filed: Apr. 4, 2003

(30) Foreign Application Priority Data

Apr. 8, 2002 (JP) .............................. 2002-105564

(51) Int. Cl.$^7$ ............................................ B24B 49/00
(52) U.S. Cl. .............................. 451/5; 451/8; 451/251; 451/256
(58) Field of Search .............................. 451/5, 8, 9, 10, 451/251, 254, 255, 256, 258

(56) References Cited

U.S. PATENT DOCUMENTS

| | | | |
|---|---|---|---|
| 4,612,736 A | * | 9/1986 | Massard et al. ................ 451/5 |
| 4,885,875 A | * | 12/1989 | Soper ............................ 451/43 |
| 5,022,187 A | | 6/1991 | Longuet et al. |
| 5,161,333 A | * | 11/1992 | Lecerf et al. ................... 451/21 |
| 5,460,562 A | * | 10/1995 | Lecere et al. ................... 451/5 |
| 5,605,498 A | * | 2/1997 | Nauche ........................ 451/240 |
| 5,882,247 A | * | 3/1999 | Longuet et al. .............. 451/236 |
| 5,895,314 A | * | 4/1999 | Kitao et al. .................... 451/43 |
| 6,045,432 A | * | 4/2000 | Shibata ........................... 451/5 |
| 6,168,505 B1 | | 1/2001 | Gottschald |
| 6,283,826 B1 | * | 9/2001 | Mizuno ........................... 451/6 |
| 6,497,614 B1 | * | 12/2002 | Kobayashi et al. ........... 451/43 |
| 6,579,155 B1 | * | 6/2003 | Luderich et al. .............. 451/43 |
| 6,719,609 B1 | * | 4/2004 | Mizuno et al. ................ 451/10 |

FOREIGN PATENT DOCUMENTS

| | | |
|---|---|---|
| EP | 1 138 436 A2 | 10/2001 |
| FR | 2481635 A1 | 11/1981 |
| JP | 6047656 | 2/1994 |
| JP | 2002018686 | 1/2002 |

OTHER PUBLICATIONS

European Search Report for EP 03 00 7809, completed Oct. 7, 2003, mailed Oct. 14, 2003, by T. Schultz.

* cited by examiner

Primary Examiner—M. Rachuba
(74) Attorney, Agent, or Firm—Griffin & Szipl, P.C.

(57) ABSTRACT

An apparatus for processing a lens comprising: a means for supporting a lens that freely displaces towards a tool and comprises a holding shaft supporting the lens so that the lens freely rotates, and a means for detecting an angle that detects a rotation angle of the holding shaft; a means for positioning that moves to contact with and separated from the means for supporting a lens, wherein the means for positioning restricts displacement of the means for supporting the lens towards the tool at a position corresponding to a prescribed lens processing amount determined based on the rotation angle and the data describing a shape of a lens frame; a means for amplifying a relative displacement that amplifies a relative displacement between the means for supporting a lens and a means for positioning; and a means for detection that detects when processing conducted at the rotation angle is complete.

13 Claims, 8 Drawing Sheets

APPARATUS FOR PROCESSING A LENS

FIELD OF THE INVENTION

The present invention relates to an apparatus for processing a lens used for processing the peripheral portion of a lens, such as a spectacle lens, to provide a prescribed shape so that the lens can be fitted into a lens frame of a spectacle frame.

BACKGROUND OF THE INVENTION

In the art of making lenses, when a lens, such as a spectacle lens, is processed so that the lens may be fitted into a lens frame of a spectacle frame, the peripheral face of an uncut lens is ground by a grinder or cut by a cutter. In this manner, the peripheral portion of the uncut lens is formed into a prescribed shape in accordance with data corresponding to the shape of the lens frame of the spectacle frame.

Prior art examples of the known processing apparatus for this purpose include, as disclosed in Japanese Patent Application Laid-Open No. 2002-18686, apparatuses in which a rotating tool (a grinder), which can be freely rotated to grind the peripheral face of the lens, is disposed around a shaft on a base. The position of lens grinding or cutting is set by driving a shaft supporting the lens, which can be freely swung relative to the shaft of the rotating tool, towards the shaft of the rotating tool by an arm and rotating the lens around the axis thereof.

In these apparatuses, the depth of processing of a lens is decided based on the data describing the shape of the lens frame. An arm having a lens-holding shaft is swung to the angle in accordance with, or corresponding to, the lens processing depth (also referred to as the "lens processing amount"). A sensor that detects the angle of the arm corresponding to the prescribed processing depth is disposed so as to detect when the processing has reached the prescribed processing depth. In this manner, the apparatus determines when the prescribed shape of the peripheral portion of the processed lens has been formed.

However, the above prior art apparatuses have a problem in that, because the completion of the prescribed shape of the peripheral portion is directly detected by the swing angle of the arm, it is difficult to accurately detect when processing is completed. Basically, the change in the swing angle of the arm that corresponds to the position of complete processing is very small because the processing depth is generally very small. As a result of these small changes that are difficult to detect, an error frequently arises in the completed shape of the lens.

The present invention endeavors to overcome the above problems and has an object of providing an apparatus that processes a lens in accordance with the data describing the shape of the lens frame, and that exhibits an improved lens processing accuracy by detecting the completion of lens processing with a great accuracy.

SUMMARY OF THE INVENTION

The present invention provides an apparatus for processing a lens which processes a peripheral portion of a spectacle lens in accordance with data describing a shape of a lens frame, the apparatus including: (a) a lens support that is freely displaceable towards a tool and comprises a holding shaft supporting the lens so that the lens is freely rotatable, (b) a positioning member movable to contact with and separate from the lens support and disposed to restrict the displacement of the lens support towards the tool at a position corresponding to an amount of processing of a lens based on a shape of a lens frame, (c) a means for amplifying a relative displacement that amplifies a relative displacement between the lens support and the positioning member, and (d) a detector arranged to detect, through the amplified displacement, that processing to be conducted at a rotation angle has been completed when the lens support contacts the positioning member.

In accordance with the present invention, the processing amount is determined by displacing the positioning member in accordance with both the rotation angle of the holding shaft and data describing the shape of the lens frame. The lens support is displaced towards a tool. The displacement of the means for supporting a lens is restricted by the means for positioning so that the processing amount (i.e., the processing depth), which is determined based on the rotation angle and the data describing a shape of a lens frame at the rotation angle, is achieved. Thus, processing proceeds and is completed in this manner. In accordance with the present invention, because the relative displacement between the lens support and the positioning member is amplified, it is possible to detect the moment in time when the lens support is brought into contact with the positioning member with great accuracy, thereby improving the accuracy of lens processing. In practice, the lens processing of a lens continues while the lens-holding shaft is rotated until the output of the detector signals the completion of lens processing along the entire peripheral portion of the lens. However, the apparatus of the present invention easily detects that the lens processing has been completed along the entire peripheral portion of the lens under these operating conditions.

A major advantage of the apparatus in accordance with the present invention is that the reliability of the lens processing can be improved because the lens processing does not proceed beyond the position set by the means for positioning.

ILLUSTRATIVE EMBODIMENTS OF THE INVENTION

An embodiment of the present invention will be described in the following with reference to the Figures, wherein like parts are represented by like character references.

Figure 1:
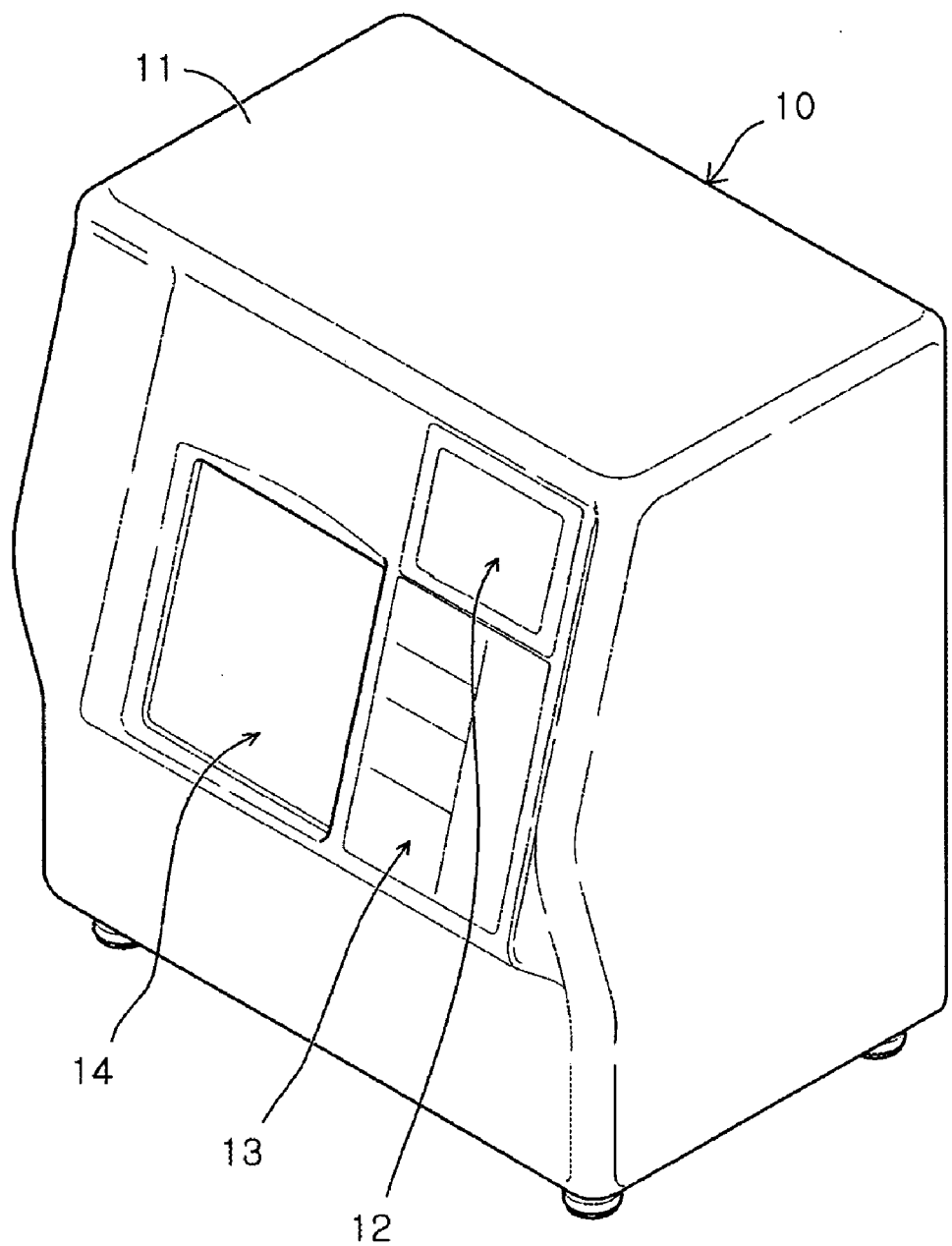
FIG. 1 shows a perspective view of an apparatus for processing a lens according to the present invention.
Figure 2:
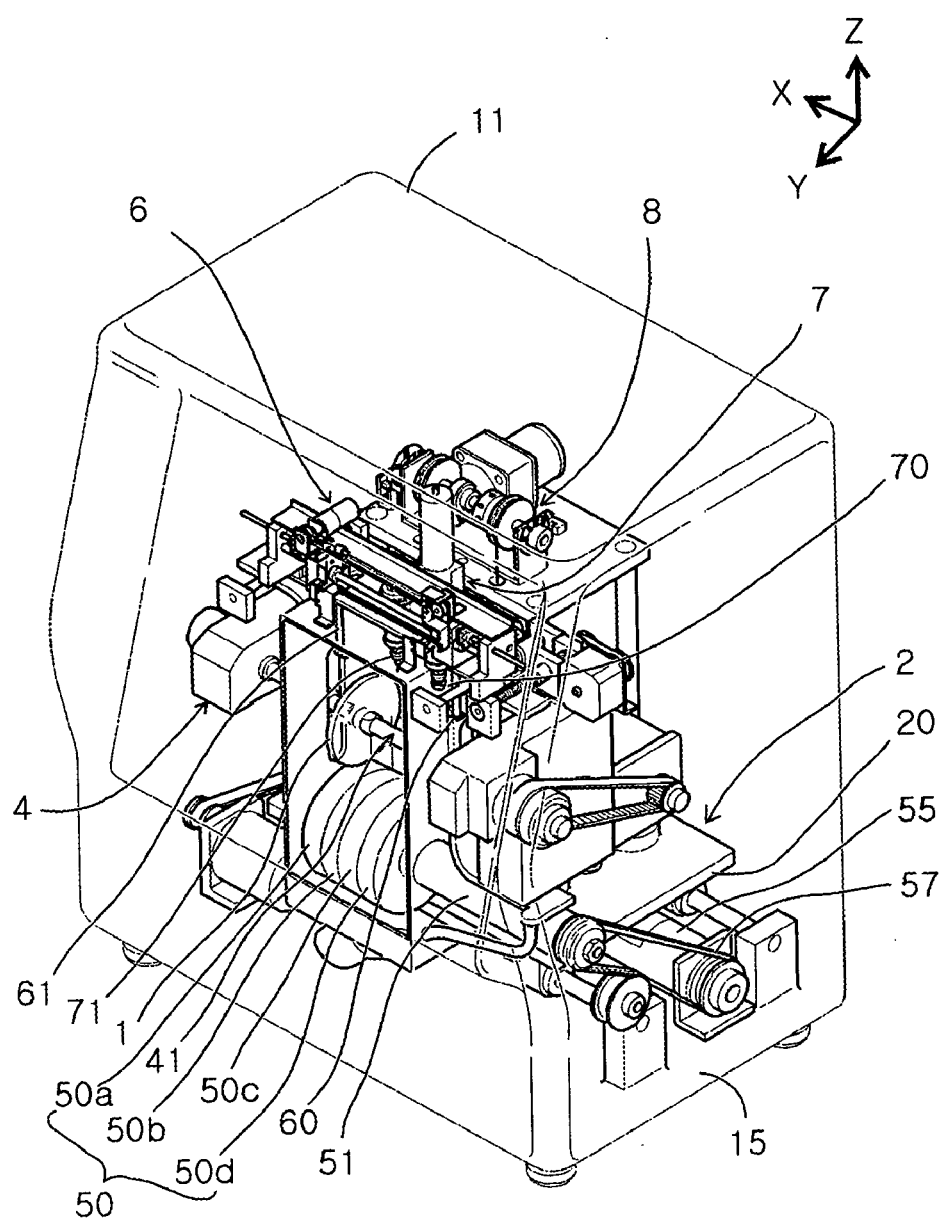
FIG. 2 shows a perspective view exhibiting the main portions of the inner construction of the apparatus in FIG. 1.
Figure 3:
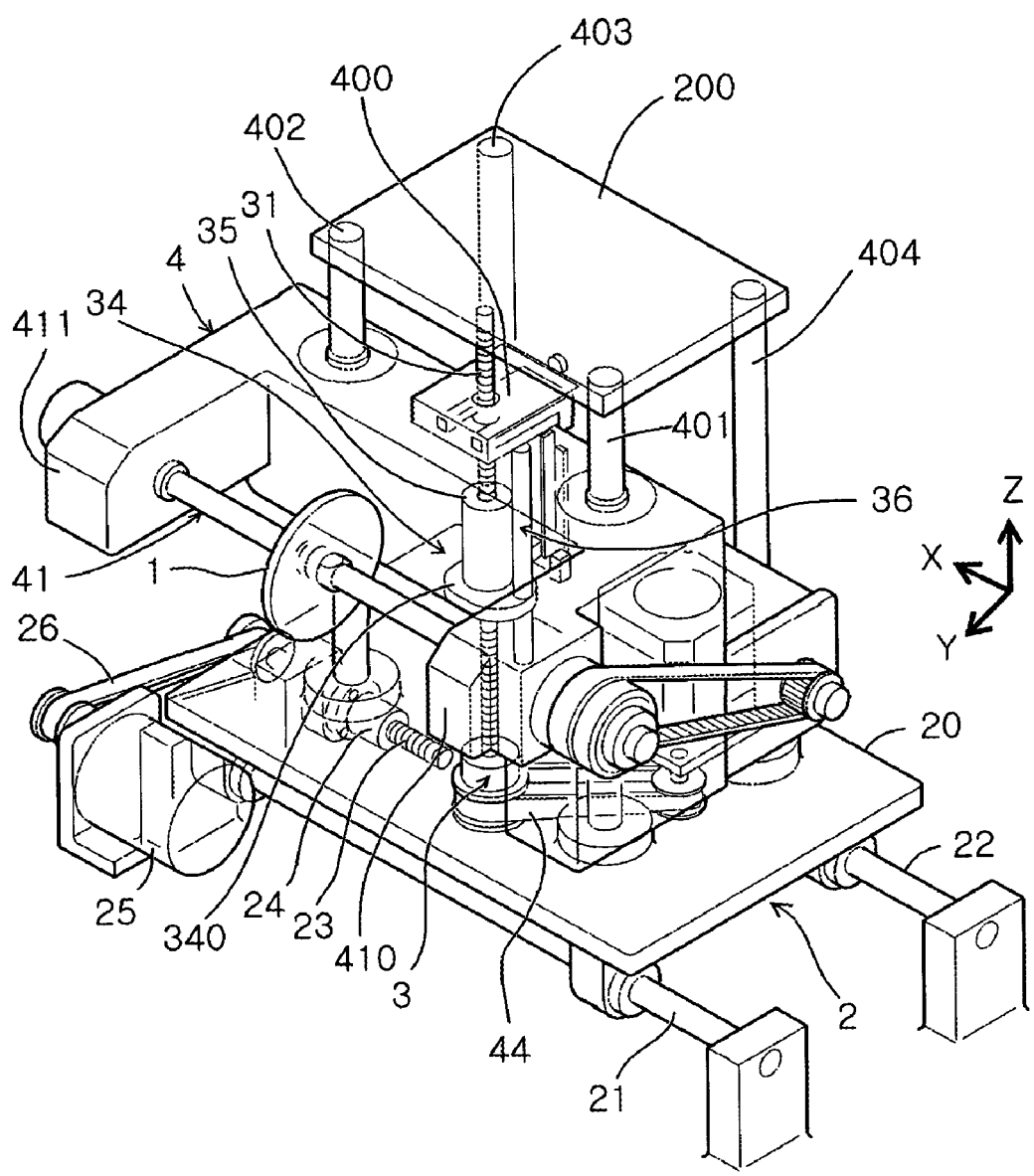
FIG. 3 shows a perspective view exhibiting a base unit, an elevating and lowering unit and a lens unit in the inner construction shown in FIG. 2.

FIG. 1 is a perspective view of an apparatus 10 for processing a lens in accordance with the present invention. FIGS. 2 and 3 show perspective views exhibiting the inner construction of the lens processing apparatus 10.

In FIG. 1, at the right side of the front of the lens processing apparatus 10, contained in a case 11 having the shape of a rectangular parallelepiped, is disposed an operation portion 13 for selecting or inputting the lens processing conditions for the lens and a display portion 12 for displaying information on the processing, such as the data describing the shape of the lens frame and the lens processing data used for the processing. The operation portion 13 includes touch panels, touch switches, keys, other manual controls, and the like. The display portion 12 includes LCD, CRT, other display assemblies, and the like.

At the front center of the lens processing apparatus 10, a door 14 is disposed, which can be opened or closed as desired, and is used for inserting or taking out a lens.

After the interior construction of the lens processing apparatus 10 is generally described, various members and portions will be described in detail.

General Outline of the Interior Construction of the Lens processing Apparatus

In FIGS. 2 and 3, a base unit 2, which can be displaced in the direction parallel with a main shaft 51 (i.e., the direction of the X-axis in the FIGS. 2 and 3), is disposed inside of the case 11. The base unit 2 supports a lens unit 4 (also called "a lens-holding unit"), which can be displaced in the vertical direction (i.e., in the direction of the Z-axis in the Figures). The main shaft 51 has a main rotating tool 50 disposed thereon.

Figure 4:
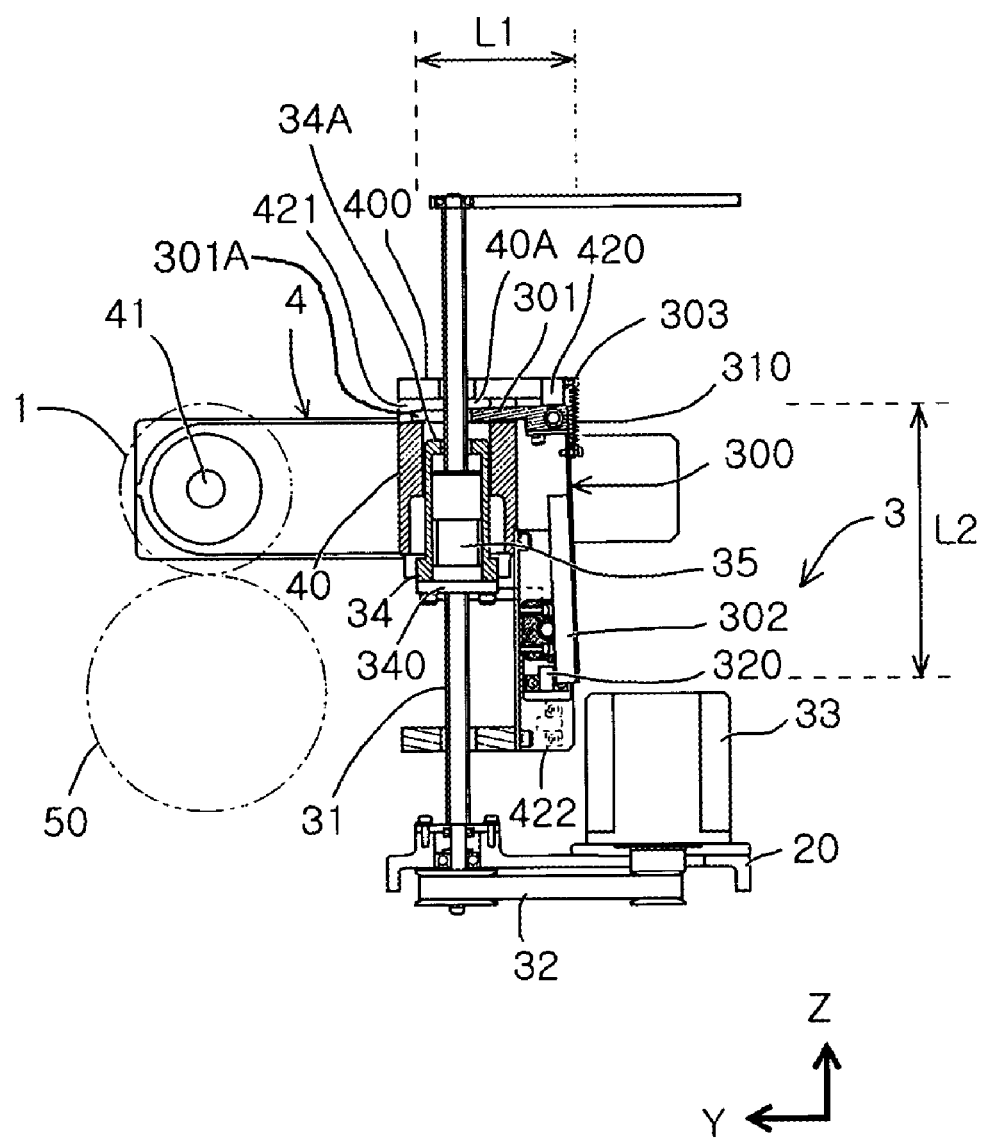
FIG. 4 shows a sectional view of the elevating and lowering unit and the lens unit in the vertical direction when processing has started.

The direction from the right to the left in FIG. 2 (i.e., the transverse direction of the apparatus 10 for processing a lens) is assigned to the X-axis, the vertical direction (i.e., the direction of the height of the apparatus) is assigned to the Z-axis, and the direction from the left to the right in FIG. 4 (i.e., the direction towards the inside of the apparatus) is assigned to the Y-axis. It is assumed that these axes orthogonally intersect each other to provide a conventional Cartesian coordinate system.

The lens unit 4 includes a lens-holding shaft 41, which is divided into two portions 41R, 41L and selectively holds the center of the lens 1 between the two portions. The lens-holding shaft 41 is disposed in a manner so that the lens-holding shaft is freely rotatable. The lens-holding shaft 41 is placed on the vertical line of a main rotating tool 50, which is a grinder or a cutter, or the like that is supported by a shaft on a base plate 15. The lens-holding shaft 41 and the main shaft 51 of the main rotating tool 50 are arranged parallel with each other along the X-axis.

A measuring unit 6 comprising styluses 60 and 61 for measuring positions on the concave face 1b and the convex face 1a, respectively, of the lens 1 is fixed on the vertical line of the lens-holding shaft 41.

The styluses 60 and 61 can be displaced in the direction parallel with the lens-holding shaft 41. To measure the position of the lens 1 after processing is completed, the styluses 60 and 61 are brought into contact with both faces of the lens 1 when the lens unit 4 is in an elevated condition. The lens unit 4 is then elevated or lowered in accordance with the data describing the shape of the lens frame while the lens-holding shaft 41 is rotated.

For processing the lens 1, starting from the condition shown in FIG. 2, the lens unit 4 is lowered after the main rotating tool 50 is rotated and the peripheral portion (i.e., the outer peripheral portion) of the lens 1 is ground into the prescribed shape by elevating or lowering the lens unit 4 in accordance with data describing the shape of the lens frame while the lens-holding shaft 41 is rotated.

By elevating or lowering the lens unit 4, based on the data describing the shape of the lens frame that is used to determine corresponding rotation angles for the lens-holding shaft 41, the grinding to the desired processing depth, in accordance with the rotation angle of the lens 1, is conducted in a continuous manner. During processing, the force pressing the lens 1 against the main rotating tool 50 is called "the processing pressure" and is provided by the weight of the lens unit 4 itself. Adjustment of the processing pressure is required depending upon the material of the lens, and such adjustment is conducted by supporting a portion of the weight of the lens unit 4 by a unit 8 for controlling the processing pressure that is disposed at a position above the lens unit 4.

The position of contact between the lens 1 and the main rotating tool 50 is changed by displacing the base unit 2 in the direction of the X-axis as evident from FIG. 2. By displacing the base unit 2 in the direction of the X-axis, a selection between flat grinding and the beveled grinding can be made depending upon whether one of grinders 50a, 50b or one of grinders 50c, 50d is in contact with the lens 1. Likewise, switching between the rough grinding and the finishing grinding can also be made depending upon whether one of grinders 50a, 50c or one of grinders 50b, 50d is in contact with the lens 1.

A finishing unit 7, which can be displaced in the direction of the Y-axis, is disposed at a position above the lens unit 4. When the finishing unit 7 is at an advanced position, a rotating tool 70 for chamfering and a rotating tool 71 for grooving are placed at a position directly above the lens-holding shaft 41. The selection between the rotating tools 70 and 71 is made depending upon whether chamfering or grooving is required, and the processing position is set by elevating the lens unit 4 in the direction of the Z-axis and driving the base unit 2 in the direction of the X-axis. Finishing is then conducted with the apparatus 10 in this condition.

Various portions of the inner construction of the lens processing apparatus 10 will be described in more detail as follows.

The Main Shaft Unit

In FIGS. 2, 3 and 4, the main shaft 51, upon which the rotating tool 50 (a grinder or a cutter having diamond or the like) is disposed, and a motor 55 for driving the main shaft 51 are fixed to the base plate 15 inside of the case 11. The main shaft unit includes main shaft 51, rotating tool 50, and motor 55 as the main components.

The main shaft 51, as shown in FIG. 2, is supported by a support shaft mounted on the base plate 15 along the X-axis in a manner that allows the main shaft 51 to be rotated freely around the support shaft. Main shaft 51 is disposed to be parallel with the lens-holding shaft 41.

At the end portion of the main shaft 51, a main rotating tool 50 for mechanically processing the lens 1 is attached. The main rotating tool 50 is placed at the central portion of the apparatus 10 in the direction of the X-axis as shown in FIG. 2 and at the front side of the apparatus 10 (i.e., at the lower left side as shown in FIG. 4). The base end portion of the main shaft 51, (located at the right side in FIG. 2), is driven by a motor 55 via a belt 57 and pulleys.

As shown in FIG. 2, the main rotating tool 50, which mechanically processes the lens 1, includes a rough grinder 50*a* for flat grinding, a finishing grinder 50*b* for flat grinding, a rough grinder 50*c* for beveled grinding, and a finishing grinder 50*d* for beveled grinding, each disposed successively from the side of the tip of the main shaft 51 (i.e., from the left side in FIG. 2). In the alternative, grinding may also be conducted by using cutters as the rotating tool in place of the grinders without departing from the scope of the present invention.

The Base Unit

A base unit 2 for driving the lens unit 4 in the direction of the X-axis is disposed at a position posterior to the main shaft 51 in FIG. 2 (i.e., in the direction of the Y-axis at the right side in the Figure).

As shown in FIG. 3, the base unit 2 includes a base 20, which can be displaced in the direction of the X-axis, and a servomotor 25 (hereinafter, referred to as the "X-axis motor"), which controls the positioning of the base 20 by driving the base 20 in the direction of the X-axis.

The base 20 is disposed on guide members 21 and 22, which are fixed on the base plate 15 and oriented along the direction of the X-axis in a manner such that the base 20 can be freely displaced along the X-axis. Therefore, the base 20 can be freely displaced in the direction of the X-axis.

As shown in FIG. 3, an inner screw 23 is disposed at a position below the base 20 and between the guide members 21 and 22 in a manner such that the inner screw 23 can be rotated freely about its own axis. An outer screw 24 fixed at the lower face of the base 20 is engaged with the inner screw 23 and the base 20 is driven in the direction of the X-axis by rotation of the screw 23. Screw 23 is driven to rotate by the X-motor 25.

One end of the inner screw 23 and the X-axis motor 25 are connected to each other via a gear and a cogged belt 26, and the base 20 is positioned in the direction of the X-axis in accordance with the rotation angle of the X-axis motor 25.

The Elevating and Lowering Unit

As shown in FIG. 3, four poles 401, 402, 403, and 404 stand on the base 20. Among the four poles, the two poles 401 and 402 penetrate a frame 40 of the lens unit 4 so as to guide the lens unit 4 in the vertical direction (i.e., the direction of the Z-axis) in a manner such that the lens unit 4 can be displaced freely in the vertical direction.

As shown in FIGS. 3 and 4, the lens unit 4 is driven in the vertical direction and positioned in the vertical direction by the elevating and lowering unit 3, which is displaced in the direction of the Z-axis. On the other hand, the lens unit 4 is positioned in the direction of the X-axis by the base unit 2 as discussed above.

Figure 6:
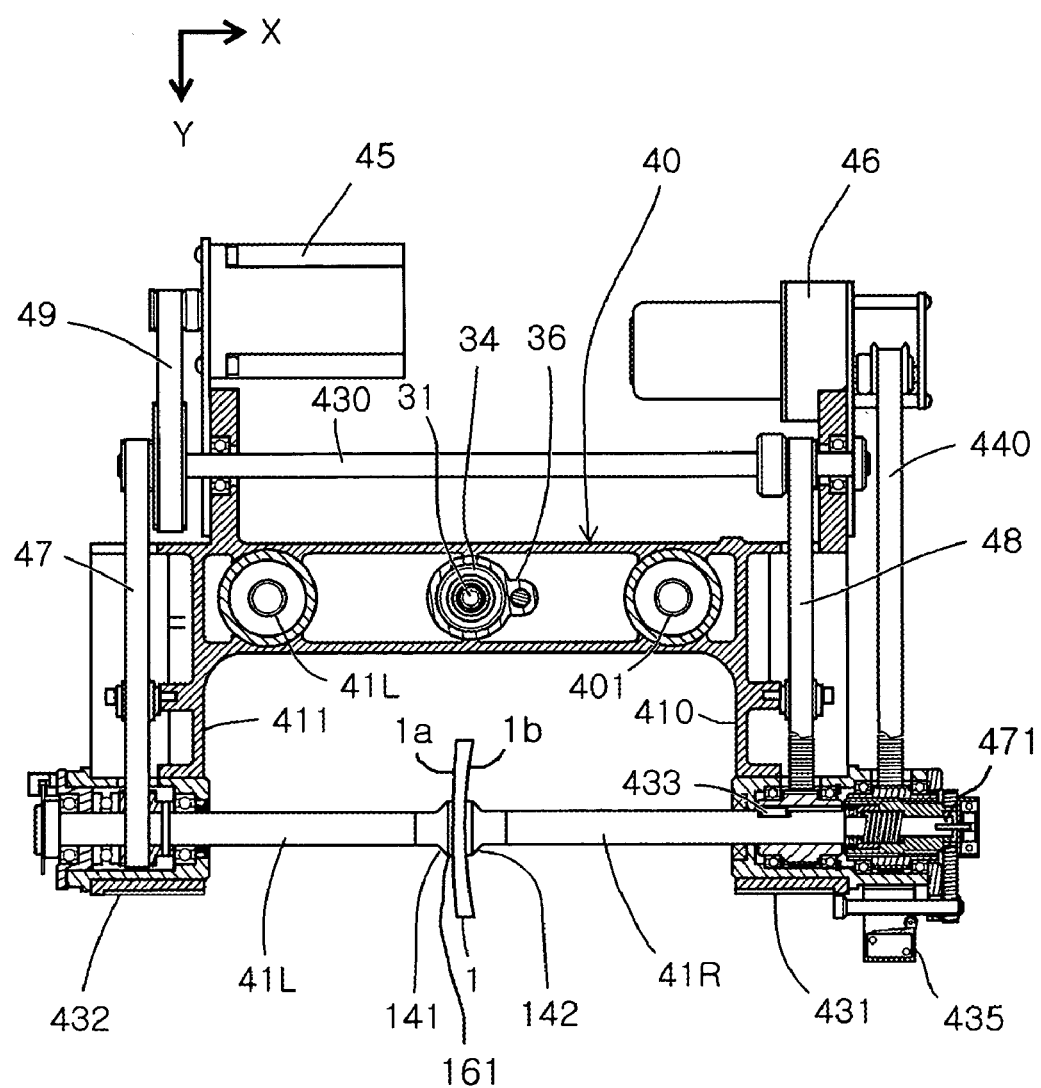
FIG. 6 shows a sectional view of the elevating and lowering unit and the lens unit in the horizontal direction in the condition that the lens is held by the lens-holding shafts (this is the "lens holding condition").

The elevating and lowering unit 3, as shown in FIGS. 3, 4 and 6, includes the following: a screw 31, which is supported by a shaft on the base 20 between the poles 401 and 402 and penetrates the frame 40 of the lens unit 4 in the vertical direction; a positioning member 34, which is engaged with the screw 31 at the inner peripheral portion of the positioning member and which can support the lens unit 4 by contacting the frame 40 of the lens unit 4 at the upper end of the positioning member; and a servomotor 33 (hereinafter, referred to as a "Z-axis motor"), which is connected to the lower end of the screw 31 via a cogged belt 32 and a gear. The elevating and lowering unit 3 is disposed on the base 20.

In the elevating and lowering unit 3, the screw 31 is rotated by driving the Z-axis motor 33 so that the positioning member 34, having an outer screw 35 engaged with the screw 31, is driven in the direction of the Z-axis. The outer screw 35 is displaced in the direction of the Z-axis because the rotating movement in the circumferential direction is restricted by a mechanism at the lens unit 4, as is discussed later.

As shown in FIG. 4, the positioning member 34 contacts the inner periphery of a hole portion 40A formed in the frame 40 of the lens unit 4. The contact between the positioning member 34 and the inner periphery of the hole portion 40A occurs in the vertical direction in a manner so that the positioning member 34 can slide and make a relative displacement in the vertical direction within the hole portion 40A.

At the upper end of the hole portion 40A, a ceiling portion 400 connected to the frame 40 is disposed. As shown in FIGS. 3 and 6, along side of the outer screw 35 of the positioning member 34, a stopper 36 standing in the direction of the Z-axis is disposed at a position so that the stopper 36 can contact the lower face of the ceiling portion 400.

In FIG. 3, the stopper 36 is shown protruding from the upper portion of the positioning member 34 and contacts the lower face of the ceiling portion 400 so that the weight of the lens unit 4 applied by the ceiling portion 400 is supported by the positioning member 34, which includes both the stopper 36 and the outer screw 35. The outer screw 35 and the stopper 36 are connected to each other at each base portion through a base 340 of the positioning member 34.

As evident from FIG. 6, the hole portion 40A of the frame 40 has a sectional shape such that the positioning member 34 and the stopper 36 fix each other around the Z-axis (i.e., in the direction perpendicular to the plane of FIG. 6) so that idle rotation of the outer screw 35 by the rotation of the screw 31 is prevented. In other words, the stopper 36 is fixed at the side of the outer screw 35 and connected to the outer screw 35 by base 340. Stopper 36 is arrested by the hole portion 40A so the rotation of the positioning member 34 is also prevented. Thus, the outer screw 35 is elevated or lowered by the rotation of the screw 31 and the positioning member 34 is displaced in the direction of the Z-axis due to this movement of the outer screw member 35.

Figure 5:
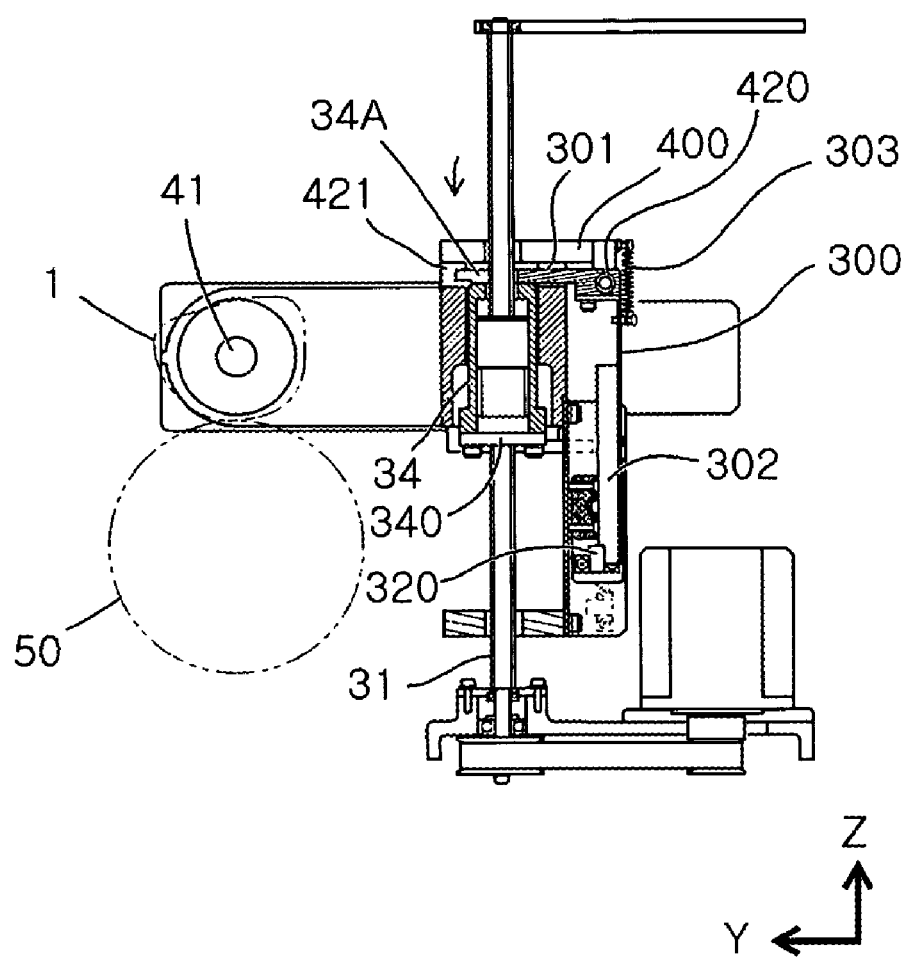
FIG. 5 shows a sectional view of the elevating and lowering unit and the lens unit in the vertical direction at a moment in time when the processing is completed.

When the stopper 36 does not contact the ceiling portion 400, the lens 1 supported by the lens unit 4 is brought into contact with the main rotating tool 50, as shown in FIG. 5, and the weight of the lens unit 4 itself is applied as the processing pressure. The upper end face 34A of the positioning member 34 and the lower face of the ceiling portion 400 do not contact each other. Consequently, a prescribed gap is formed between the upper end face 34*a* of the positioning member 34 and the lower face of the ceiling portion 400.

At a position below the ceiling portion 400 and facing the gap, a hole portion 421 is provided in frame 40. A sensor arm 300 for detecting completion of the processing on the lens unit 4, in the vertical direction, is also provided. The sensor arm 300 may be referred to as a "means for amplifying a relative displacement." An end of the sensor arm 300 is inserted into the hole portion 421 and is disposed along the Y-axis, as is shown in FIG. 4, in a manner such that the hole portion 421 penetrates the frame 40 across the hole portion 40A. In other words, hole portion 421 and hole portion 40A are contiguous.

The sensor arm 300, as shown in FIGS. 4 and 5, is an integrally formed arm having the shape of an inverse L, which is composed of an arm 301 extending to the left side in the Figures (in the direction of the Y-axis) and that inserts into the hole portion 421, and an arm 302 extending in the lower direction in the Figure (in the direction of the Z-axis, to the side of the base 20). The arm 301 and the arm 302 are disposed approximately perpendicularly to each other. The length of the arm 302 in the vertical direction is set longer than that of the arm 301 in the horizontal direction.

A bending portion 303, located at the middle of the sensor arm 300 having the shape of an inverse L, is supported by a shaft 420 disposed by the ceiling portion 400 of the lens unit 4 in a manner so that the bending portion 303 can freely swing around the shaft 420. Therefore, the sensor arm 300 can swing around the X-axis.

Between the arm 302 extending in the direction of the Z-axis and the ceiling portion 400, a spring 310 is disposed, which pushes or biases the arm 301 that extends in the direction of the Y-axis to rotate towards the lower direction in FIGS. 4 and 5 (i.e., to rotate in the counter-clockwise direction about shaft 420 shown in the Figures).

Since the arm 301 inserts into the hole portion 421 and crosses the hole portion 40A in the direction of the Y-axis, arm 301 is constructed to include a penetrating portion through which the screw 31 inserts. Furthermore, arm 301 is connected so that the lower face of the arm 301 faces towards the inner periphery of the hole portion 40A so that the lower face of the arm 301 can be brought into contact with, or separated from, the upper end face 34A of the positioning member 34.

Since the sensor arm 300 is pushed in the counter-clockwise direction, as evident in FIG. 4, by the spring 310, the tip 301A of the arm 301 is brought into contact with the lower side of the hole portion 421 and stops there when the upper end face 34A of the positioning member 34 and the arm 301 are separated from each other (this is the condition whenever the stopper 36 is separated from the ceiling 400).

On the other hand, as shown in FIG. 5, when the stopper 36 of the positioning member 34 contacts the ceiling portion 400 of the lens unit 4, the positioning member 34 supports the lens unit 4, and the upper end face 34A of the positioning member 34 pushes the arm 301 in the upper direction (i.e., clockwise). In other words, when stopper 36 contacts ceiling portion 400, the positioning member 34 contacts the arm 301 and pushes the arm in the clockwise direction about shaft 420 in a pivotal manner. When this occurs, the sensor arm 300 rotates and the arm 302 extending in the direction of the Z-axis is placed at the prescribed position (for example, a position in the vertical direction as shown in FIG. 5).

A bracket 422 protruding along the lower portion (i.e., arm 302) of the sensor arm 300 is disposed at the frame 40. At a prescribed position of the bracket 422, which can face the lower end of the arm 302 that swings around the X-axis, a sensor 320 is disposed at a position located approximately below the shaft 420. Sensor 320 is for detecting completion of the processing 320 by detecting the approach of the free end portion of the arm 302 swinging around the X-axis. The "free end portion" of sensor arm 300 is defined to be the end portion of the sensor arm 300 that is detected by the sensor 320 for detecting completion of the processing. In the present embodiment, the "free end portion" corresponds to the end portion of the arm 302.

The sensor 320 for detecting completion of the processing is, for example, constructed to include a photosensor, such as a photointerruptor. As shown in FIG. 5, when the swinging arm 302 comes to the prescribed position (i.e., the position in the vertical direction where the lens unit 4 and the positioning member 34 are brought into contact with each other) and the light of the photointerruptor of the sensor 320 for detecting completion of the processing is interrupted, the sensor 320 is switched to ON so as to detect that processing has been completed. The prescribed position wherein the sensor 320 detects the presence of the free end portion of the sensor arm 300 is referred to as the "position of detecting the arm" or the "position detecting the completion of processing."

The relative lengths of the arms 301 and 302 from the swing shaft 420 provide a lever ratio for the sensor arm 300 having the shape of an inverse L. Specifically, the distance L2 from the swing shaft 420 to the position where the free end portion of the arm 302 faces to the sensor 320 for detecting completion of the processing (refer to FIG. 4), is set to be longer than the distance L1. L1 is the distance from the swing shaft 420 to the position where the arm 301 is brought into contact with the upper end face 34A of the positioning member 34 (refer to FIG. 4). The amount of the relative displacement of the arm 301, which is used to detect the relative displacement between the lens unit 4 and the positioning member 34, is amplified in accordance with the ratio of L2 to L1 (hereinafter, referred to as the lever ratio; L2/L1) so that the lower end of the arm 302 is displaced by the amplified amount. In other words, for any amount of displacement of arm 301, there is a corresponding displacement of arm 302 that is equal to the lever ratio times the amount of displacement of arm 301.

As described above, the weight of the lens unit 4 provides the processing pressure for the lens 1. The lens unit 4 is just guided to move along the poles 401 and 402 in a manner such that displacement of the lens unit 4 can be made in the vertical direction. As evident from FIG. 4, when the positioning member 34 is lowered and positioned below the lens unit 4 so as to separate from the lens unit 4, the lens 1 is brought into contact with the main rotating tool 50. When the positioning member 34 has separated from lens unit 4 (i.e., the inner periphery of the hole portion 40A is separated from the upper face 34A of the positioning member 34), the weight of the lens unit 4 is applied to the lens and the grinding starts.

When the screw 31 is rotated to lower and place the positioning member 34 at the position providing the prescribed processing depth, as shown in FIG. 4, a gap is formed between the upper end face 34A of the positioning member 34 and the lower face of the arm 301. Simultaneously, the axis of the lens 1 slowly approaches the main rotating tool 50 so that the lens 1 is eventually ground under the weight of the lens unit 4. When this condition occurs, the sensor arm 300 is pushed in the counter-clockwise direction and the arm 301 is stopped at the lower face of the hole portion 421. The lower end of the arm 302 is placed at a position separated from the sensor 320 for detecting completion of the processing. Consequently, the output of the sensor 320 for detecting completion of the processing is indicated as OFF because arm 302 is separated from the detection range of the sensor 320.

When the lens 1 has been ground to the prescribed depth as the result of the grinding as shown in FIG. 5, the lens unit 4 would have been lowered further due to its own weight; however, this further undesired displacement of the lens unit 4 towards the main rotating unit 50 is restricted by the positioning member 34. In other words, the positioning member 34 also serves to prevent grinding in excess of the prescribed processing depth.

Thus, as the lens unit 4 is lowered during the lens processing, eventually the upper end face 34A of the positioning member 34 pushes the arm 301 in the upper direction. The sensor arm 300 is rotated in the counter-clockwise direction and the arm 302 amplifies the relative displacement between the lens unit 4 and the positioning member 34 by the prescribed lever ratio. The arm 302 passes through the sensing range of sensor 320 for detecting completion of the processing and the sensor 320 for detecting completion of the processing is switched to ON. In this manner, the apparatus 10 detects that position of the complete processing has been reached and further displacement of the lens unit 4 is restricted by the positioning member 34.

Because the distance between the position of the lens unit 4 in the vertical direction and the position of the positioning member 34 in the vertical direction (i.e., that corresponds to the desired processing depth) is amplified by the lever ratio described above by the swing of the arm 302, the apparatus 10 can detect, with a great accuracy, that the prescribed processing depth has been achieved by using the sensor 320 for detecting completion of the processing.

The elevating and lowering unit 3 supports the lens unit 4 in the elevating direction. After the lens unit 4 starts the processing of the lens 1, the processing depth, (also called the processing amount), is decided by the position of the elevating and lowering unit 3 in the direction of the Z-axis. In other words, movement of the lens unit 4 by the elevating and lowering unit 3 occurs in a manner so that apparatus 10 directs the processing depth, whereas movement of the lens unit 4 from an initial lens processing position shown in FIG. 4 (i.e., the upper face 34A of positioning member 34 is separated from the inner periphery of the hole portion 40A) to a completed lens processing position shown in FIG. 5 (i.e., the upper face 34A of positioning member 34 is in contact with the inner periphery of the hole portion 40A) occurs during actual lens grinding or cutting.

The Lens Unit

The lens unit 4 that is displaced by the elevating and lowering unit 3 in the direction of the Z-axis, as shown in FIG. 3, is guided by the two poles 401 and 402 standing on the base 20 in the vertical direction (i.e., in the direction of the Z-axis) in a manner such that the lens unit 4 can be freely displaced. Lens unit 4 is constructed to include the lens-holding shaft 41, which is divided into two portions 41R and 41L, a motor 45 for driving the lens 1 that rotates the lens-holding shaft 41, and a motor 46 for the lens chuck that changes the holding pressure of the two portions of the lens-holding shaft 41 that hold the lens 1.

As shown in FIG. 4, the lens-holding shaft 41 that holds and rotates the lens 1 is placed at a position directly above the main rotating tool 50. The vertical direction connects the axial line of the lens-holding shaft 41 and the axial line of the main shaft 51 as shown in FIG. 4.

Connected to the frame 40 of the lens unit 4, as shown in FIGS. 3 and 6, are arms 410 and 411 disposed to protrude in the direction towards the front of the apparatus (i.e., to the lower left side of FIG. 3). Frame 40 and the arms 410 and 411 form a rectangle having three sides that is open to one side (i.e., "C"-shaped). The arms 410 and 411 support the lens-holding shaft 41.

As shown in FIGS. 3 and 6, the lens-holding shaft 41 is divided at its center into two shaft portions 41R, 41L, which include a pushing or pressing shaft 41R supported by the arm 410 and a holding shaft 41L supported by the arm 411. The shaft 41L is supported by the arm 411 at the left side in FIG. 6 in a manner that allows shaft 41L to be freely rotated. The shaft 41R is supported by the arm 410 at the right side in FIG. 6 in a manner that allows the shaft 41R to be freely rotated and to be displaced in the axial direction (i.e., in the direction of the X-axis).

The shafts 41L and 41R are rotated by the motor 45 for driving the lens via cogged belts 47, 48 and 49. The cogged belts 47 and 48 are connected to each other through a rotatable shaft 430 so that the rotation angles of the shafts 41L and 41R are synchronized. To achieve this synchronization, a gear 432 is engaged with the cogged belt 47 and is fixed to the shaft 41L and a gear 431 is engaged with the cogged belt 48 and is fixed to the shaft 41R. So that the shaft 41R can be axially displaced, relative to the arm 410, in the direction of the X-axis, the shaft 41R is arrested in the direction of rotation by the key 433 disposed between the shaft 41R and the inner periphery of the gear 431. Key 433 can be relatively displaced in the direction of the X-axis, which moves along with shaft 41R when displaced in the direction of the X-axis.

As shown in FIG. 6, a chuck mechanism driven by a motor 46 for the lens chuck is disposed at the end portion (i.e., at the right side in the Figure) of the shaft 41R.

Figure 7:
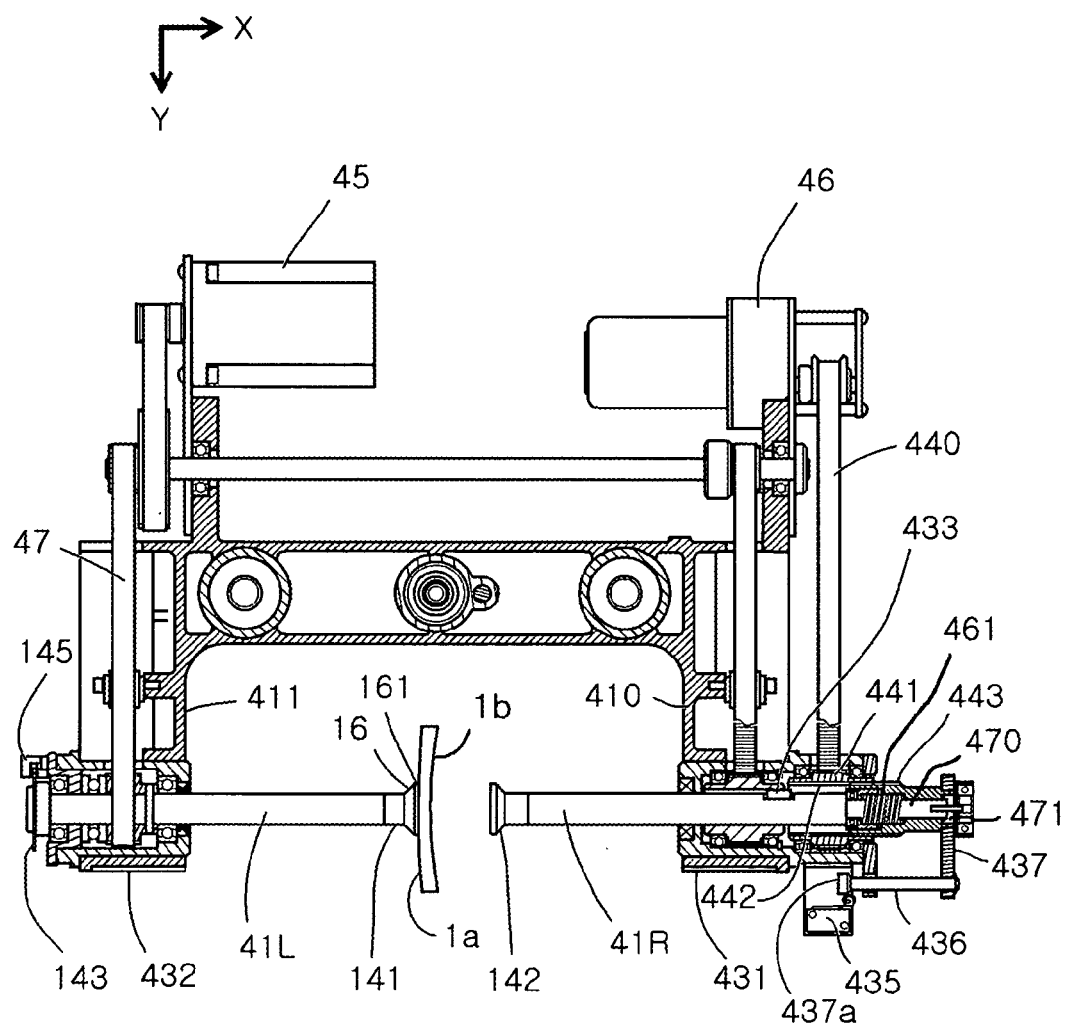
FIG. 7 shows a sectional view of the elevating and lowering unit and the lens unit in the horizontal direction in the condition that the lens is released from the lens-holding shaft (this is the "lens releasing condition").

In the chuck mechanism, as shown in FIG. 7, an outer screw 442 is formed at the inner periphery of a gear 441 engaged with the cogged belt 440. The outer screw 442 is engaged with an inner screw portion 443 formed at a driving member 461, which can be brought into contact with the shaft 41R in the axial direction.

The position of rotation of the shaft 41R is decided by the motor 45 for driving the lens that is connected to the cogged belt 48. As for determining the position of the shaft 41R in the axial direction, as will be described later, gear 441 is rotated by the rotation of the motor 46 for the lens chuck, which causes the inner screw portion 443 of the driving member 461 engaged with the outer screw 442 to be displaced in the axial direction. Due to this axial displacement, the shaft 41R is pushed in the direction of the X-axis by the driving member 461 and the end portion of the shaft 41R is brought into contact with the lens 1 as shown in FIG. 6. The pressure with which the shaft 41R and the shaft 41L hold the lens 1 is called the "holding pressure," and can be set at a desired value by the motor 46 for the lens chuck. In the present embodiment, the holding pressure for the lens 1 is set by the value of the electric current driving the motor 46 for the lens chuck. Therefore, control of the electric current controls the motor 46 thereby setting the value of the holding pressure.

In FIG. 7, a receiver 141 of the lens holder is fixed at the tip of the left shaft 41L of the lens-holding shaft 41. To the receiver 141 of the lens holder, a lens holder 16 attaches. Prior to attaching lens holder 16 to the receiver 141, a lens 1 to be processed is fixed in advance to the lens holder 16. The lens holder 16 can be attached or released freely from receiver 141 and from lens 1.

On the other hand, the shaft 41R, disposed on the same axial line as that of the shaft 41L, moves in the direction of the X-axis and holds the lens at the tip. In other words, the shaft 41R moves towards the lens 1 by being driven by the motor 46 for the lens chuck and presses the lens 1 with a lens presser 142 disposed at the tip of shaft 41R. The lens 1 is pressed towards the lens-holding shaft 41L and held between the two shafts 41R, 41L by the holding pressure generated by motor 46. The lens presser 142 is made of a resin, such as rubber, having elasticity so as to prevent damage to the lens 1.

At the end face of the lens holder 16, which is formed into a concave shape, the convex face 1a of the lens 1 is coaxially adhered via a double faced adhesive pad 161 and the lens presser 142 presses the concave face 1b of the lens 1. The lens presser 142 is attached to the tip of the shaft 41R so as to hold the lens 1 in a manner whereby the lens presser can be swung in any desired direction and the concave face 1b of the lens 1 is still pressed with excellent balance without any adverse local concentration of pressure on the lens.

As evident from FIG. 7, which illustrates the starting condition wherein lens 1 is fixed to the lens holder 16 attached to the shaft 41L, the lens 1 is held by the lens presser 142 in the following manner: (a) the motor 46 for the lens chuck is driven in the prescribed direction (i.e., the positive rotation); (b) the gear 441 is rotated in the positive direction due to this movement of the motor 46; and (c) the shaft 41R is displaced towards the left side in FIG. 7 by the relative rotation of the outer screw 442 at the inner periphery of the gear 441 and the inner screw portion 443 of the shaft 41R. A sensor rod 436 is connected to the driving member 461 having the inner screw portion 443. The sensor rod 436 is placed parallel with the shaft 41R using a plate 437 disposed at the end portion of the driving member 461, and protruding to the side of the pushing shaft 41R. Sensor rod 436 prevents rotation of the inner screw 443 because the sensor rod 436 is arrested in the direction of rotation by the plate 437 disposed at the end portion of the driving member 461 so that the driving member 461 is driven in the axial direction alone.

To displace the shaft 41R in the direction of the X-axis and towards the left side of FIG. 7 to achieve the lens holding condition, the driving member 461 pushes the shaft 41R, which is thereby displaced in the direction of the X-axis until it presses the lens presser 142 to the concave face 1b of the lens 1.

When the motor 46 for the lens chuck is further rotated even though the lens presser 142 is in contact with the concave face 1b of the lens, the force for pressing (i.e., the lens holding pressure) the lens 1 increases and the electric current consumed by the motor 46 for the lens chuck increases. The pressure of holding the lens (also referred to as the lens holding pressure) is set at a desired value by detecting the electric current consumed by the motor 46.

On the other hand, when the processing is completed, the motor 46 for the lens chuck is rotated in the reverse direction and the shaft 41R is driven to the right side in FIG. 7, which illustrates the lens releasing condition. Under the lens releasing condition, the lens presser 142 is separated from the lens 1 and a prescribed gap is formed between the lens 1 and the lens presser 142 as shown in FIG. 7. The shaft 41R is displaced to the waiting position which allows attachment and detachment of the lens 1 and the lens holder 16 from the receiver 141. When the driving member 461 is displaced in the direction of the right side in the Figure by a snap ring 471, or the like, disposed at a shaft portion 470 having a small diameter protruding from the right tip of the shaft 41R to the right side in FIG. 7, the shaft portion 470 is pulled by the driving member 461 and displaced to the right side as shown.

Because the pushing shaft 41R of the lens-holding shaft 41 is displaceable in the axial direction of the X-axis, it is necessary to have a mechanism that can determine the position of the shaft 41R. When the shaft 41R moves towards the lens 1, as shown in FIG. 6, the position of shaft 41R is detected by a sensor not shown in the Figure that detects when the lens-holding shaft 41 contacts the lens 1, and the lens holding pressure is determined by monitoring the electric current consumed by the motor 46 for the lens chuck. However, when the shaft 41R moves to the right side towards the waiting position shown in FIG. 7, the prescribed waiting position is detected by a limit switch 435 disposed close to the arm 410 of the lens unit 4. Specifically, limit switch 435 detects the detecting portion 437a of the sensor rod 436 as it moves along with plate 437 and shaft 41R to the waiting position shown in FIG. 7.

In FIG. 7, the limit switch 435 is shown fixed to the arm 410 at the position supporting the gear 441.

At the right end portion of the shaft 41R, a sensor rod 436 is disposed via a plate 437 so as to be parallel with the shaft 41R. Sensor rod 435 protrudes along side of the shaft 41R. At the end portion of the sensor rod 436, there is formed a detecting portion 437a, which can contact the limit switch 435 at the prescribed waiting position.

When the shaft 41R moves to the right side shown in the FIG. 7, the sensor rod 436 is fixed to the shaft 41R and also moves to the right side. As shown in FIG. 7, the position where the detecting portion 437a contacts the limit switch 435 corresponds to the waiting position of the shaft 41R, and the limit switch 435 is switched to ON at this position.

To determine the processing depth in accordance with the rotation angle of the lens 1, the shaft 41L is constructed to penetrate the arm 411 and a slit plate 143 that is fixed at the end portion of the shaft 41L protrudes from the arm 411. By detecting the position of rotation of the slit plate 143 using a photosensor 145 (i.e., a lens position sensor; also referred to as "a means for detecting the angle") fixed to the arm 411, the position (i.e., the rotation angle) of the lens 1 held by the lens-holding shaft 41L is detected (i.e., measured).

In the lens unit 4 having the construction described above, when the lens 1 is fixed at the receiver 141 of the lens holder, the motor 46 for the lens chuck is driven and the lens-holding shaft 41R is moved towards the left side of FIG. 7. The lens 1 is then held, or fixed under pressure, when the lens presser 142 presses against the lens 1.

As evident from FIG. 3, the main rotating tool 50 is fixed to the base plate 15 and is not displaced. The lens 1 supported by the lens unit 4 is displaced in the vertical direction relative to the main rotating tool 50 by the displacement of the elevating and lowering unit 3 in the direction of the Z-axis so that the processing can be conducted to the desired processing depth.

The position of the lens 1 for processing can be changed by changing the rotation angle of the motor 46 for driving the lens so that the peripheral portion of the lens can be processed to the desired processing depth.

The tool used for processing can be changed by changing the position of contact between the lens 1 and the main rotating tool 50 by adjusting the displacement of the base 20 in the direction of the X-axis. In other words, by moving the base 20 in the direction of the X-axis, one of the grinders 50a, 50b, 50c, and 50d can be selected for use in processing.

The Control Unit

Figure 8:
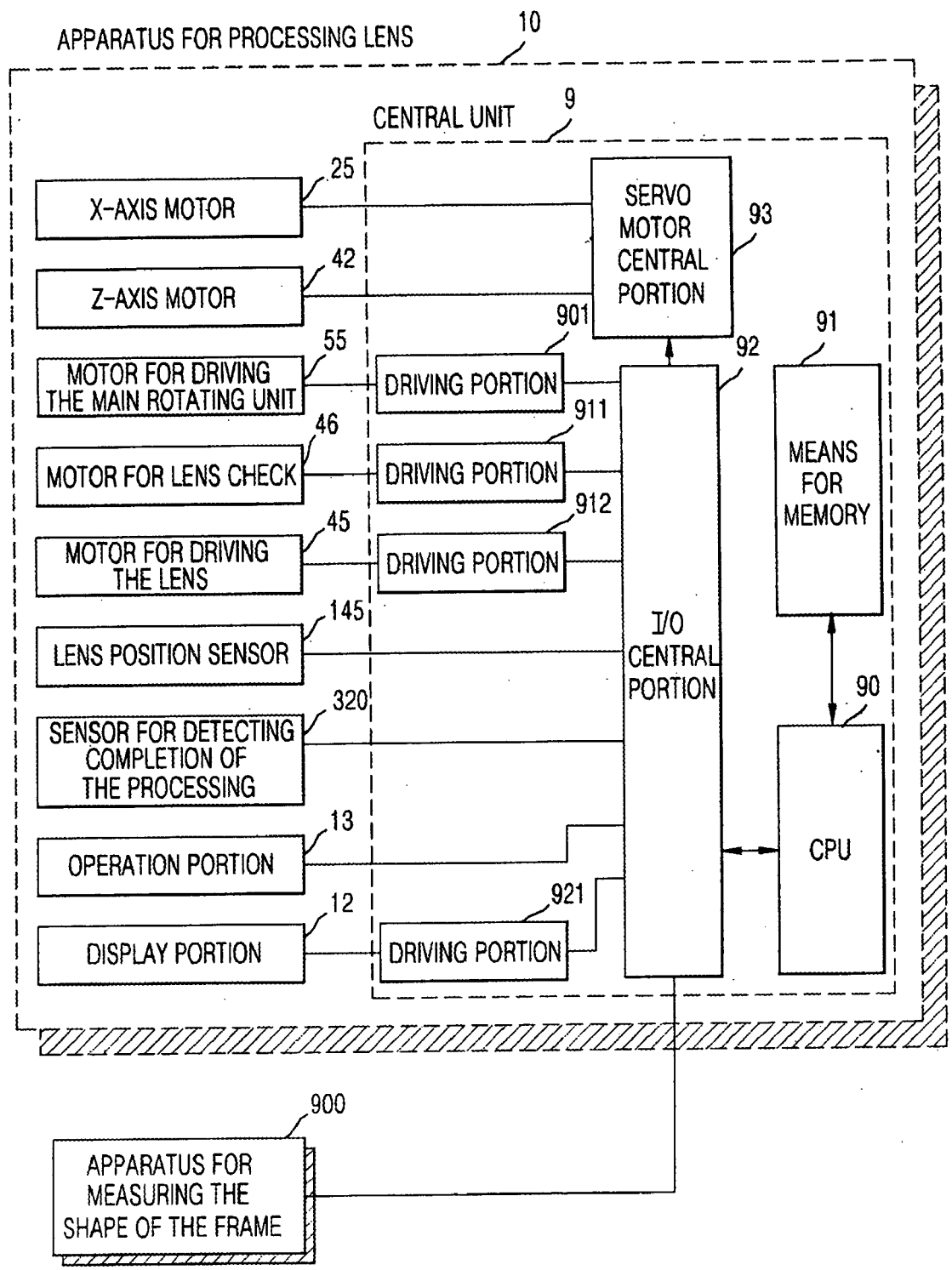
FIG. 8 shows a block diagram exhibiting construction of the control portion.

The lens processing apparatus 10 is constructed to include the various mechanisms (units) described above, and further has a control unit 9 (also referred to as the "central unit") for controlling these various mechanisms as shown in FIG. 8.

As shown in FIG. 8, the control unit 9 includes a microprocessor (CPU) 90, a means for memory (i.e., a memory, a hard disk and the like) 91 and an I/O control portion (i.e., an interface) 92 connected to the CPU 90, which is connected to the motors and the sensors of the apparatus 10. The control unit 9 reads the data describing the shape of the lens frame that is sent from the apparatus 900 for measuring the shape of the frame. The apparatus 900 for measuring the shape of the frame is placed outside of the apparatus 10, but it is connected to send lens frame shape data to the control unit 9. The control unit 9 also reads inputted data from various sensors, and generates various output control signals to drive the various motors of the apparatus 10 so that the prescribed processing is conducted based on the properties (i.e., the material, the hardness and the like) of the lens 1, which is set by the operation portion 13. A suitable apparatus 900 for measuring the shape of the frame is the apparatus disclosed in Japanese Patent Application Laid-Open No. Heisei 6(1994)-47656; however, other similar types of devices can be used without departing from the scope of the present invention.

The control unit 9 also comprises a servomotor control portion 93 that positions the lens unit 4 in the directions of the X-axis and the Z-axis by driving the X-axis motor 25 of the base unit 2 and the Z-axis motor 42 of the elevating and lowering unit 3, respectively.

The motor 55 for driving the main rotating unit 50 is connected to the I/O control portion 92 via driving portion 901 so that the condition of rotation, or the speed of rotation, is controlled in accordance with the direction from the microprocessor 90. In other words, microprocessor 90 sends control signals to motor 55 via I/O central portion 92 and driving portion 901.

The motor 46 for the lens chuck, which controls the holding pressure applied to the lens 1 by changing the position of the shaft 41R of the lens-holding shaft 41, is connected to the I/O control portion 92 via a driving portion 911 so as to control the holding pressure in accordance with the driving electric current.

The motor 45 for driving the lens is connected to the I/O control portion 92 via a driving portion 912 that controls the rotation angle of the lens-holding shaft 41, and therefore the rotation angle of the lens 1. The microprocessor 90 directs the processing position of the lens 1 based on the data describing the shape of the lens frame obtained from the apparatus 900 for measuring the shape of the frame. In addition to the lens frame shape data, microprocessor 90 also uses rotation angle data provided by the sensor 145 for detecting the position of the lens, which detects the rotation angle of the lens 1 to generate control signals for the Z-axis motor. Microprocessor 90 uses these control signals to drive the Z-axis motor 42 so that the processing depth, in accordance with the rotation angle based on the data describing the shape of the lens frame, is achieved.

When the prescribed processing depth is achieved, a sensor 320 for detecting completion of processing, which will be described later in detail, is switched ON. The microprocessor 90 receives this signal from the sensor 320 and decides that the processing, in accordance with the rotation angle of the lens, has been completed.

The operation portion 13, disposed on the front of the cover of the apparatus 10 for processing a lens, is connected to the I/O control portion 92 and transfers the direction data inputted by the operator (for example, the material of the lens 1 and whether the processing should be with or without the beveled processing or the grooving) to the microprocessor 90. Microprocessor 90 outputs the response to these operator-inputted directions so that the information corresponding to the processing content is outputted to the display portion 12 via the driving portion 921.

By operating the control portion 9, data for flat grinding and data for beveled grinding that are used for flat grinding and for beveled grinding, respectively, are created by calculation from the data describing the shape of the lens frame. Furthermore, data for grooving and data for chamfering are created by calculation based on the positions of the entire peripheral portion (i.e., coordinates of apices at the side of the convex face 1a and at the side of the concave face 1b) of the lens 1, wherein these positions of the entire peripheral portion are measured by the measuring unit 6 based on the data describing the shape of the lens frame.

During the processing of a lens, the servomotor control portion 93 drives the X-axis motor and the Z-axis motor in accordance with the lens processing data corresponding to the rotation angle of the lens 1, which is also the rotation angle of the lens-holding shaft 41. The rotation angle of the lens 1 is detected by the sensor 145 for detecting the position of the lens so that the lens 1 is displaced relative to the rotating tool 50 in accordance with the lens position data provided by the sensor 145. The processing is conducted in this manner.

Outline of the Processing

The lens processing procedures performed using the apparatus 10 for processing a lens will be described as follows. The outlined method includes both preparatory steps and lens processing steps.

First, the lens 1 is set into the lens-holding shaft 41. Next, the data describing the shape of the lens frame are read by the apparatus 900 for measuring the shape of the frame, which measures the shape of a lens frame that is outside of apparatus 10. Subsequently, an operator uses the operation portion 13 to input the directions corresponding to the conditions of the lens processing, such as the material of the lens 1 and whether the processing should be with or without the beveled processing or the grooving. To begin the lens processing steps, the operator inputs the direction signal for starting the processing using the operation portion 13. Then, the steps of the lens processing are conducted.

When the start of lens processing is directed, the pressing shaft 41R of the lens-holding shaft 41 is displaced to the position for holding the lens shown in FIG. 6 by driving the motor 46 for the lens chuck and the holding pressure is set in accordance with the material of the lens 1.

To process the lens 1, the main rotating tool 50 is rotated by driving the motor 55. The lens unit 4 is lowered by driving the elevating and lowering unit 3 in accordance with the processing amount (i.e., processing depth, also referred to as the "cutting amount") computed based on the rotation angle of the lens 1, determined from the output of the photosensor 145, and the data describing the shape of the lens frame. The base unit 2 is displaced in the direction of the X-axis to the position where the peripheral portion of the lens 1 faces towards the rough grinder 50a for flat grinding of the main rotating tool 50. The processing depth is provided and set by the elevating and lowering unit 3 while the lens 1 is rotated by the motor 45 for driving the lens. Then, the rough grinding is conducted to achieve the processing depth calculated at every rotation angle of the lens-holding shaft 41.

When the sensor 320 for detecting completion of the processing, which is part of the above lens unit 4, gives the ON signal for the entire periphery of the lens, sensor 320 has detected that the grinding step has been completed.

Once the rough processing is completed, the lens unit 4 is temporarily elevated. The base unit 2 is moved in the direction of the X-axis to the position where the lens 1 faces towards the finishing grinder 50b for flat grinding of the main rotating tool 50. Then, the finishing grinding is conducted in the same manner as is conducted for the rough grinding step. When the sensor 320 for detecting completion of the processing of the lens unit 4 gives the ON signal for the entire periphery of the lens 1, the finishing processing on the entire peripheral portion of the lens 1 is completed.

Thereafter, grooving and chamfering are conducted by the finishing unit 7. Once these steps are completed, the pressing shaft 41R of the lens-holding shaft 41 is displaced to the position for releasing the lens shown in FIG. 7 by driving the motor 46 for the lens chuck. With the apparatus 10 in the lens releasing condition, the operator removes the completely processed lens 1 from the apparatus.

Workings of the Apparatus in Accordance with the Present Invention

As described above, the lens unit 4, which can be displaced in the vertical direction, is elevated or lowered by the elevating and lowering unit 3 so as to be brought into contact with, or separated from, the elevating and lowering unit 3 in the vertical direction. The elevating and lowering unit 3, while in contact with the lens unit 4, is lowered to a first position wherein the lens 1 is brought into contact with the main rotating tool 50. The elevating and lowering unit 3 is lowered further from the first position to the second position in the vertical direction that corresponds to the prescribed processing depth. When the elevating and lowering unit 3 moves from the first position to the second position, the elevating and lowering unit separates from the lens unit 4. The lens 1 is subsequently ground under the vertical pressure provided mainly by the weight of the lens unit 4.

As shown in FIGS. 4 and 5, detection of the complete processing position (i.e., the position wherein lens processing is complete) is performed by the sensor 320 for detecting completion of the processing and a sensor arm 300 that are fixed to the lens unit 4. Sensor arm 300 has the shape of an inverse L and is supported by the lens unit 4 in a manner allowing the sensor arm 300 to swing freely. One end portion of the sensor arm 300 can be brought into contact with, or separated from, the positioning member 34 of the elevating and lowering unit 3, Based on the swing position of the other end portion of the sensor arm 300, the apparatus 10 detects when the lens unit 4 has reached the prescribed processing depth. The prescribed processing depth corresponds to the condition wherein the elevating and lowering unit 3 reestablishes contact with the lens unit 4 while the elevating and lowering unit 3 is in the second position. The processing depth is reached because the lens unit 4 is lowered by its own weight while lens processing of lens 1 occurs.

Because the distance from the swing shaft 420 to the detecting position of the sensor 320 for detecting completion of the processing is set longer that the distance from the swing shaft 420 to the position where the sensor arm 300 is brought into contact with the positioning member 34, the displacement in the direction of the Z-axis of the arm 301 for detecting the relative displacement in the direction of the Z-axis between the lens unit 4 and the positioning member 34 is amplified so that the lower end portion of the arm 302 can be swung by an amplified value of the displacement of arm 301. Therefore, the complete processing position can be detected with great accuracy, which improves the accuracy of lens processing.

In the above embodiment of the invention, the sensor arm 300 has the shape of an inverse L. This shape is used to prevent an increase in the size in the inner direction (i.e., in the direction of the Y-axis corresponding to an internal depth of the apparatus) since the various mechanisms of the apparatus 10 for processing a lens are vertically arranged. When the various mechanisms are horizontally arranged, it is acceptable that the sensor arm be constructed to have a linear shape. Thus, one skilled in the art would realize that the angle between the sensor arm 301 and the sensor arm 302 can be suitably set in accordance with the arrangement of the various mechanisms housed within case 11. In other words, the sensor arm of the present invention can be constructed to have other geometries besides the L-shape or a linear shape without departing from the scope of the invention.

In the above embodiment of the invention, the sensor arm 300 is supported by the lens unit 4. Alternatively, the sensor arm may be supported by the elevating and lowering unit 3.

In the above embodiment, the present invention is applied to the lens processing apparatus 10 in which the processing of the lens 1 is conducted by displacing the lens-holding shaft 41 in the vertical direction. The present invention can also be applied to a lens processing apparatus having an arm which supports a lens-holding arm in a manner that allows the lens-holding arm to swing in a conventional manner. For example, when an arm and a positioning member for deciding the angle of the arm can be constructed so the arm and the positioning member can be brought into contact with, or separated from, each other, the relative displacement between the arm and the positioning member can be detected after being amplified by a sensor arm. In this way, the position of the contact between the arm and the positioning member is detected based on the relative displacement amplified by the sensor arm. Therefore, the same effect as that described for the above embodiment can be obtained. The present invention can be applied in the same manner to lens processing apparatuses in which a lens-holding shaft is displaced in the horizontal direction.

In the above embodiment, the sensor 320 for detecting completion of the processing is disposed on the lens unit 4, which supports the sensor arm in a manner allowing the sensor arm to swing. Because the lens unit 4 and the positioning member 34 contact each other at the complete processing position, the sensor 320 for detecting completion of the processing may be disposed on the positioning member 34 without departing from the scope of the present invention.

While the present invention has been described with reference to certain preferred embodiments, one of ordinary skill in the art will recognize that additions, deletions, substitutions, modifications and improvements can be made while remaining within the spirit and scope of the present invention as defined by the appended claims.

What is claimed is:

1. An apparatus for processing a peripheral portion of a spectacle lens in accordance with data describing a shape of a lens frame, the apparatus comprising:
   a lens support that is freely displaceable towards a tool and comprises a holding shaft supporting the lens so that the lens is freely rotatable, and a detector disposed to detect an angle of rotation of the holding shaft;
   a positioning member movable to contact with and separate from the lens support, wherein the positioning member restricts displacement of the lens support towards the tool at a position corresponding to a prescribed lens processing amount that is determined based on the rotation angle and data describing a shape of a lens frame at the rotation angle;
   a means for amplifying a relative displacement that amplifies a relative displacement between the lens support and the positioning member; and
   a detector disposed to detect, using the amplified relative displacement, when processing conducted at the rotation angle has been completed while the lens support contacts the positioning member,
   wherein the tool is disposed at a position located directly below the lens support, the lens support being freely displaceable in a vertical direction, and positioning member restricting downward displacement of the lens support in the vertical direction.

2. An apparatus according to claim 1, wherein the means for amplifying a relative displacement comprises a swinging member that contacts the positioning member, wherein the swinging member is supported by a swing shaft disposed on the lens support, and a distance between the swing shaft and a position where the swinging member contacts the positioning member is smaller than a distance between the swing shaft and a free end portion of the swinging member.

3. An apparatus according to claim 2, wherein the detector is disposed to detect passage of the free end portion of the swinging member.

4. An apparatus according to claim 3, wherein the swinging member is disposed to be rotated around the swing shaft by contact between an end portion of the swinging member and the positioning member, and the detector is disposed to detect that the processing has been completed when the free end portion of the swing member passes the detector.

5. An apparatus according to claim 4, wherein the swinging member has a shape including a first arm having an end portion arranged to contact the positioning member and a second arm having a free end portion the detector, the arms being bent with respect to each other so that the second arm extends downwards.

6. An apparatus according to claim 5, wherein the swinging member has a shape of an inverse L.

7. An apparatus according to claim 5, wherein the detector is fixed to the lens support at a position below the swing shaft.

8. An apparatus according to claim 7, wherein the swinging member has a shape of an inverse L.

9. An apparatus according to claim 1, wherein the means for amplifying a relative displacement comprises a swinging member that contacts the lens support, wherein the swinging member is supported by a swing shaft disposed on the positioning member, and a first distance between the swing shaft and a position where the swinging member contacts the lens support is smaller than a second distance between the swing shaft and a free end portion of the swinging member.

10. An apparatus according to claim 1, wherein the means for amplifying a relative displacement comprises a swinging member that contacts the positioning member, wherein the swinging member is supported by a swing shaft disposed on the lens support, and a distance between the swing shaft and a position where the swinging member contacts the positioning member is smaller than a distance between the swing shaft and a free end portion of the swinging member.

11. An apparatus according to claim 1, wherein pressure of the lens against the tool is provided by a weight of the lens support.

12. An apparatus for processing a peripheral portion of a spectacle lens in accordance with data describing a shape of a lens frame, the apparatus comprising:
  a lens support that is freely displaceable towards a tool and comprises a holding shaft supporting the lens so that the lens is freely rotatable, and a detector disposed to detect an angle of rotation of the holding shaft;
  a positioning member movable to contact with and separate from the lens support, wherein the positioning member restricts displacement of the lens support towards the tool at a position corresponding to a prescribed lens processing amount that is determined based on the rotation angle and data describing a shape of a lens frame at the rotation angle;
  a means for amplifying a relative displacement that amplifies a relative displacement between the lens support and the positioning member; and
  a detector disposed to detect, using the amplified relative displacement, when processing conducted at the rotation angle has been completed while the lens support contacts the positioning member,
  wherein the means for amplifying a relative displacement comprises a swinging member that contacts the lens support, wherein the swinging member is supported by a swing shaft disposed on the positioning member, and a first distance between the swing shaft and a position where the swinging member contacts the lens support is smaller than a second distance between the swing shaft and a free end portion of the swinging member.

13. An apparatus according to claim 12, wherein the detector is arranged to detect passage of the free end portion of the swinging member.

* * * * *